United States Patent [19]
Lyons et al.

[11] Patent Number: 5,799,449
[45] Date of Patent: Sep. 1, 1998

[54] SNAP-FIT SLIDING WINDOW ASSEMBLY

[75] Inventors: David P. Lyons, Troy; Jeff R. Wittbrodt, Pinckney, both of Mich.

[73] Assignee: Excel Industries, Inc., Elkhart, Ind.

[21] Appl. No.: 721,126

[22] Filed: Sep. 26, 1996

[51] Int. Cl.$^6$ ............................................. E06B 3/32
[52] U.S. Cl. ................... 52/204.51; 52/204.51; 52/208; 52/209; 296/84.1; 296/146.1; 296/201
[58] Field of Search ................. 52/204.51, 208, 52/209; 296/84.1, 85, 89, 146.1, 152, 201; 49/374, 489.1, 453

[56] References Cited

U.S. PATENT DOCUMENTS

| | | |
|---|---|---|
| 2,597,539 | 5/1952 | Smart. |
| 2,701,162 | 2/1955 | Kliger. |
| 2,721,361 | 10/1955 | Ryan et al.. |
| 2,721,636 | 10/1955 | Ordorica et al.. |
| 3,478,475 | 11/1969 | Strack. |
| 4,571,278 | 2/1986 | Kunert. |
| 4,591,204 | 5/1986 | Gallitzendoerfer et al.. |
| 4,606,159 | 8/1986 | Kunert. |
| 4,723,809 | 2/1988 | Kida et al.. |
| 5,028,082 | 7/1991 | Kronbetter ........................ 292/128 |
| 5,154,028 | 10/1992 | Hill et al.. |
| 5,171,051 | 12/1992 | Yada. |
| 5,228,740 | 7/1993 | Saltzmann. |
| 5,522,191 | 6/1996 | Wenner et al. ...................... 52/204.51 |

Primary Examiner—Christopher Kent
Assistant Examiner—Yvonne Horton-Richardson
Attorney, Agent, or Firm—Banner & Witcoff Ltd

[57] ABSTRACT

A modular sliding window assembly for in a motor vehicle body is provided with a sliding pane subassembly which has a snap-fit with a frame subassembly. The frame subassembly preferably comprises a pair of fixed panes, an upper and lower applique, and an injection molded cover member integrating the fixed panes and the appliques. The sliding pane subassembly preferably comprises a generally horizontal run channel member and at least one glazing pane optionally having a run channel guide affixed to a peripheral edge of the pane. The pane is slidably received in a run channel formed by the run channel member. The horizontal run channel member has a snap-fit attachment preferably to one of the appliques. The appliques can have a flexible flange or the like extending inboard from the injection molded cover member, forming a step ridge or like configuration. The run channel member provides a correspondingly configured feature, such as flexible projections separated by a recess, so that the snap-fit is established by the step of the flexible flange being pushed past a captivation hook or the like on one of the flexible projections, so as to snap into place behind the captivation hook.

24 Claims, 8 Drawing Sheets

SNAP-FIT SLIDING WINDOW ASSEMBLY

FIELD OF THE INVENTION

The present invention is directed to an improved design for sliding window assemblies. More particularly, the invention is directed to window assemblies used in motor vehicles, that are simple to manufacture and are of reduced cost.

BACKGROUND

Modular sliding window assemblies are known for insertion as a pre-assembled unit into a window opening in a motor vehicle. The term "modular window" and variants, such as modular sliding window assembly, are understood by those in the industry to mean a window construction assembled separate from the final assembly of the motor vehicle. Modular sliding windows may have, for example, a frame, at least one fixed pane, and at least one sliding pane for sealingly closing an opening. One such recently developed modular sliding window assembly using an injection molded plastic frame is shown in commonly owned U.S. Pat. No. 5,522,191 to Wenner et al. Certain preferred embodiments of Wenner et al have an injection molded plastic frame bonded to one side of at least one fixed pane, and to appliques which form part of an exterior show surface of the window assembly and, hence, of the motor vehicle. Upper and lower backplates are attached to the frame, and low friction run channels are inserted into the upper and lower backplates. The sliding pane slides in the run channels between open and closed positions.

Given the constant pressure of OEM automobile manufacturers to reduce costs, it would be highly advantageous to streamline the manufacture of modular sliding window assemblies to reduce costs and facilitate a high quality product. It would also be highly advantageous to reduce the number of components in sliding window assemblies and to reduce or eliminate the need for screws or other attachment means for securing separate components.

It is an object of the present invention to provide a modular sliding window assembly of low cost, simplified manufacture and a reduced number of components. It is an additional object of the present invention to provide such modular window assemblies having at least one slidable pane integrated with one or more fixed panes, which are readily pre-assembled and suitable for meeting strict fit and finish requirements and aesthetics requirements prevalent in motor vehicle glazing operations. It is an additional object of at least certain embodiments of the present invention to provide a sliding window assembly having consistently reduced slide efforts. It is an additional object of the present invention to provide a method of producing a modular window assembly by snap-fit construction. Further objects and features of the invention will become apparent from the following disclosure taken together with the detailed discussion of certain preferred embodiments.

SUMMARY

In accordance with a first aspect, a pre-assembled modular sliding window assembly suitable for installation into an opening of a motor vehicle body, has a sliding pane subassembly which is snap-fit to a frame subassembly. The frame subassembly preferably is substantially self-supporting, meaning that it can be handled as a unit for attachment of other components, including the sliding pane subassembly. It comprises at least one fixed pane, a pair of spaced elongate appliques, and a molded plastic frame integrating the fixed pane and the appliques at least partially by surface bonding. The sliding pane subassembly comprises at least one sliding pane which may be a simple pane of glass or plastic, a laminate, etc. with raw (that is, exposed) edges or framed, for example, in plastic, optionally with one or more integral run channel guides projecting therefrom. The sliding pane subassembly further comprises a run channel, typically an elongate member of low friction plastic or other suitable construction, forming a generally U-shaped run channel slot slidingly receiving an edge of the sliding pane and/or one or more of the aforesaid run channel guides. Preferably, one of the appliques of the frame subassembly forms a second run channel, and the second applique provides a snap-fit feature, typically a recess such as a step or the like, in a projection or ledge extending inboard (that is, away from the frame). The run channel of the sliding pane subassembly has a correspondingly configured feature for a snap-fit with the step or other such feature of the second applique. Such corresponding snap-fit feature of the run channel member of the sliding pane preferably is a captivation hook extending from a projection on the run channel member to captivate the aforesaid step or other recess of the frame subassembly. The snap-fit may either permanently or releasably engage the sliding pane subassembly to the frame subassembly.

In accordance with a second aspect, preferred embodiments of a modular sliding window have a circumferential, self-supporting frame subassembly defining a primary aperture, and the sliding pane subassembly has a pair of sliding panes. The sliding pane subassembly can be self-locating to the frame subassembly, and can be snap-fit to the frame subassembly to form a complete ready-to-install modular sliding window. Snap-fit installation of the sliding pane subassembly to the frame subassembly reduces the need for screws, adhesives or other fastening devices. The frame subassembly in preferred embodiments has a pair of fixed panes and upper and lower horizontally extending, vertically spaced appliques. The fixed panes and appliques are at least partially encapsulated and held together by surface bonding with an injection molded plastic cover. Preferably, the upper applique serves as an upper run channel, thereby eliminating the need for a separate run channel member to be attached to the upper applique or otherwise integrated with the frame subassembly. The upper applique may also have unitary dimples or the like projecting into the run channel to guide the sliding panes.

In accordance with such preferred embodiments, the sliding pane subassembly has a pair of sliding panes with molded plastic run channel guides projecting from the lower peripheral edge of each. Preferably, meeting rails are positioned over facing edges of the sliding panes, with one meeting rail having a recess sized to snugly receive a projection of the other meeting rail. To produce a good seal between the sliding panes when they are in their closed position, preferably the projection of the second meeting rail is a coextruded elastomeric material of lower durometer, that is, of a softer material, than the rest of the material forming the first and second meeting rails.

In accordance with a third aspect a novel method of manufacturing a modular sliding window is provided, wherein a frame subassembly and a sliding pane subassembly are produced, and the sliding pane subassembly is then snap-fit to the frame subassembly. The frame subassembly can be produced by placing one or more fixed panes and one or more elongate appliques in an injection molding cavity, followed by introduction of a thermoplastic or thermoset polymeric material to form a full circumference frame integrating the fixed panes and the appliques into the self-supporting frame subassembly by at least partly enveloping and establishing surface-to-surface adhesion to portions of the fixed panes and appliques. The sliding pane subassembly can be produced by attaching run channel guides to peripheral edges of suitable sliding glazing panes, and then slidingly inserting the run channel guides into a run channel. The sliding pane subassembly is then positioned on or in the frame subassembly and attached with a snap-fit, for example, by hand-pressure. Preferably, edges of the sliding panes (opposite the edges carrying the aforesaid run channel guides which have been inserted into the run channel member of the sliding pane subassembly) are inserted into a second run channel in a first one of the appliques of the frame subassembly. The run channel member is then pressed into snap-fit attachment with the second applique. In this way, a first side (typically the top) of the slider subassembly is secured to the frame subassembly, followed by a second side (typically the bottom), resulting in a secure snap-fit integration of the two subassemblies to form, in combination, a modular sliding window assembly.

From the foregoing disclosure and the following more detailed description of various preferred embodiments, it will be apparent to those skilled in the art that the present invention provides a significant advance in the technology and art of modular sliding window assemblies for motor vehicles. Particularly significant in this regard is the potential the invention affords for reduced cost, reduced manufacturing steps, fewer component parts and simplicity in assembly. Additional features and advantages of various preferred embodiments will be better understood in view of the detailed description provided below.

BRIEF DESCRIPTION OF THE DRAWINGS

Certain preferred embodiments are discussed below with reference to the appended drawings wherein.

Figure 2:
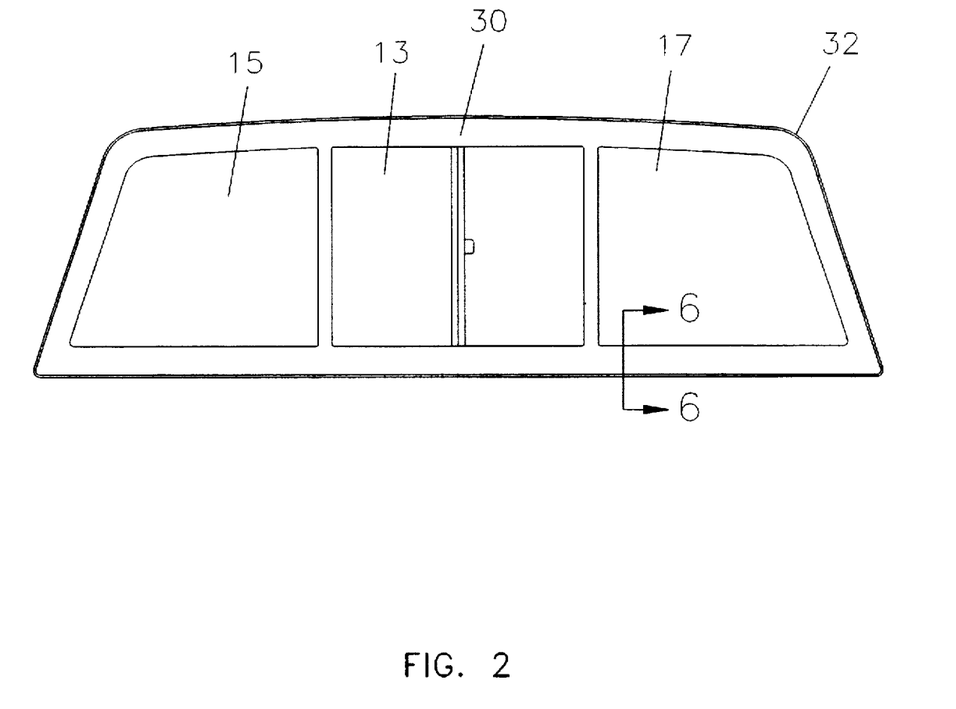
FIG. 2 is an elevation view of the outboard side of the preferred embodiment of a sliding window assembly of FIG. 1, wherein the primary aperture is closed by a pair of sliding panes of FIG. 1.
Figure 3:
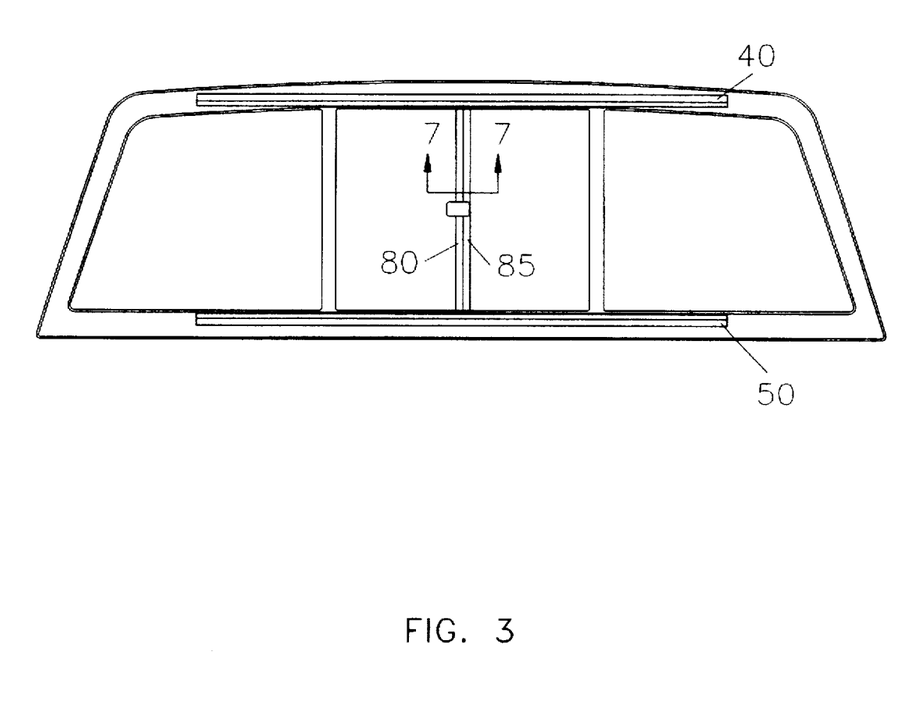
FIG. 3 is an elevation view of an inboard side of the preferred embodiment of FIG. 1, wherein the primary aperture is closed.

It should be understood that the appended drawings are not necessarily to scale, presenting a somewhat simplified representation of certain preferred embodiments illustrative of the basic principles of the invention. The specific design of modular window assemblies with a sliding pane subassembly snap-fit to a frame subassembly in accordance with the invention, including, for example, the specific configuration and dimensions of various components, will be determined in part by the intended application and use environment of the sliding window assembly. Certain features of the pre-assembled modular snap-fit window assembly shown in the drawings have been enlarged or distorted relative to others to facilitate visualization and clear understanding. In particular, thin features may be thickened, for example, for clarity of illustration. All references to direction and position, unless otherwise indicated, refer to the orientation of the modular window assemblies illustrated in the drawings. In general, directions to the right and left of the windowpane in the plane of the paper in FIG. 2 will be referred to as lateral directions. The directions normal to the plane of the paper in FIG. 2 are inboard/outboard. It should be understood, however, that modular sliding window assemblies in accordance with the invention can be used in diverse applications.

DETAILED DESCRIPTION OF CERTAIN PREFERRED EMBODIMENTS

It will be apparent to those skilled in the art, that is, to those who have knowledge and experience in this area of technology, that the modular sliding window assemblies here disclosed represent an advance that can significantly reduce costs, complexity, and manufacturing and assembly time. The following detailed discussion of various alternative and preferred features and embodiments will illustrate the general principles of the invention by example of a sliding window assembly suitable for installation as a backlite in the passenger cab of a pickup truck. Other embodiments suitable for other particular applications, such as sliding windows on vans and minivans, will be readily apparent to those skilled in the art given the benefit of this disclosure.

Figure 1:
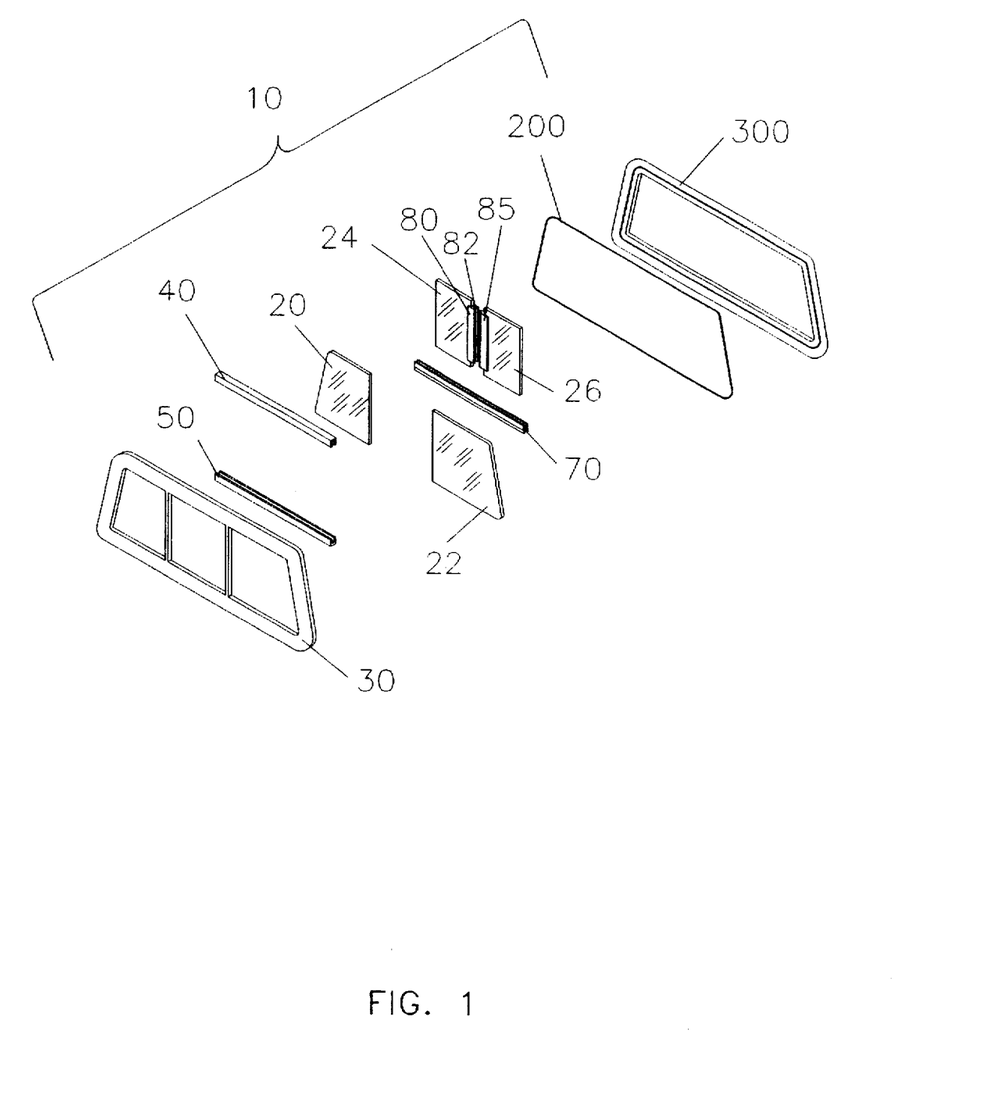
FIG. 1 is an exploded perspective view of a modular sliding window assembly in accordance with a preferred embodiment.
Figure 4:
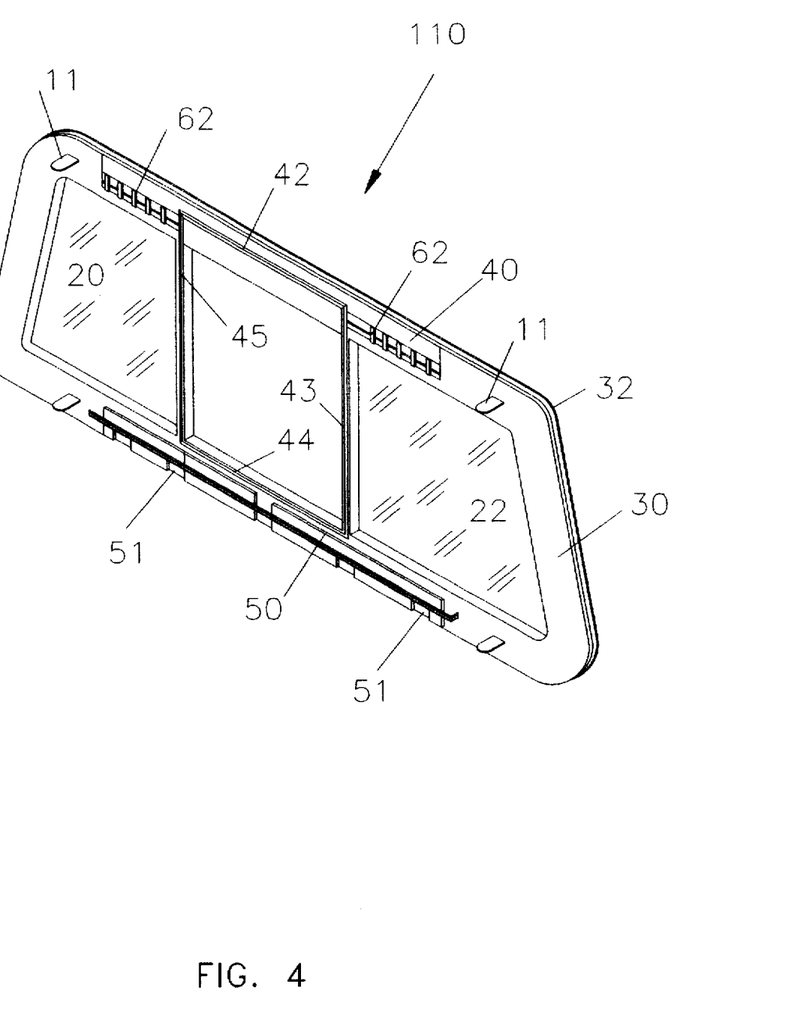
FIG. 4 is a perspective view of a frame subassembly for the modular sliding window assembly of FIGS. 1–3, with an upper applique cut away to reveal unitary sliding pane guiding dimples.
Figure 5:
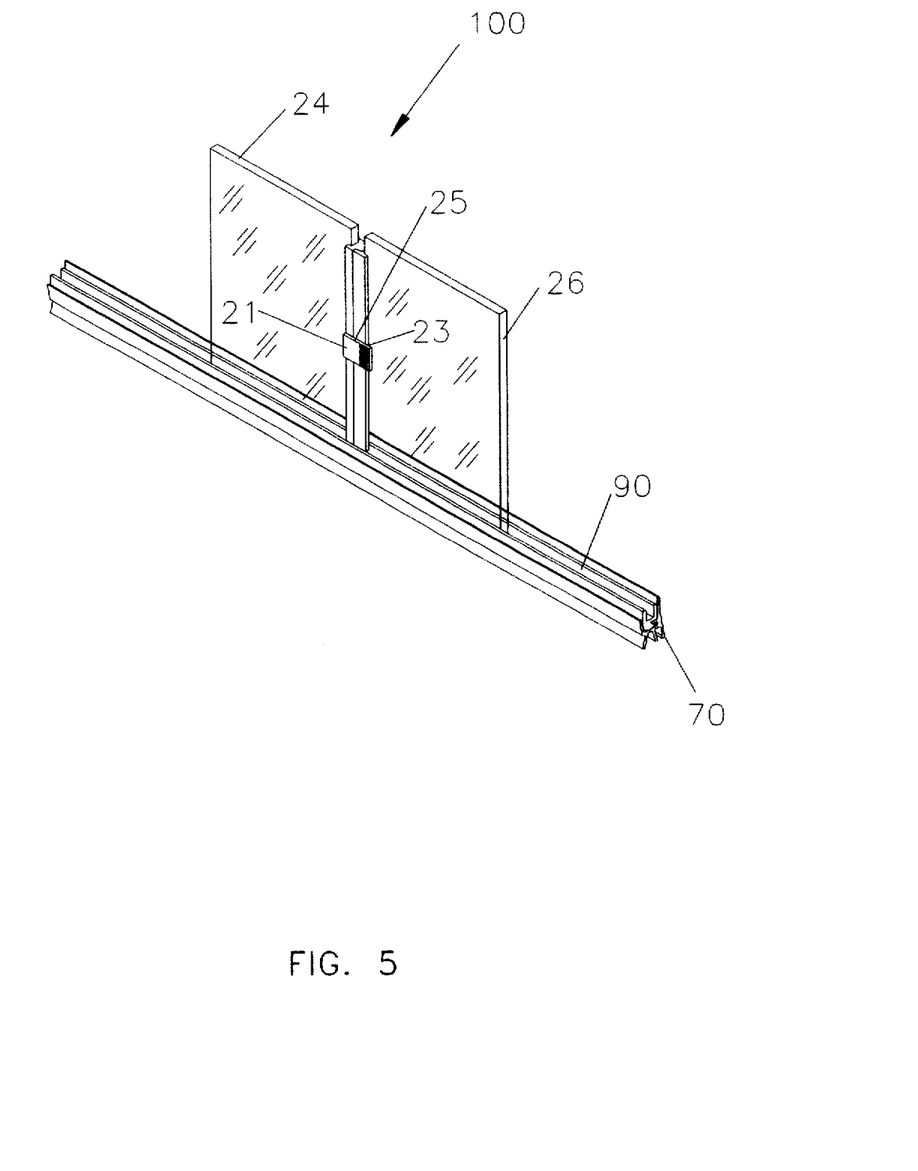
FIG. 5 is a perspective view of a sliding pane subassembly for the modular sliding window assembly of FIG. 1.

Referring now to the drawings, FIG. 1 shows an exploded perspective view of a sliding window assembly 10 suitable to be remotely built as a modular or pre-assembled unit ready for installation into a window opening in a motor vehicle body. The sliding window assembly 10 is preferably made of two subassemblies: a self-supporting frame subassembly 110, a preferred embodiment of which is shown in FIG. 4, and a sliding pane subassembly 100, a preferred embodiment of which is shown in FIG. 5. In a highly advantageous feature of the invention, the sliding pane subassembly 100 may be snap-fit to the frame subassembly 110. This eliminates the need for separate fasteners, screws, adhesives or the like.

Looking at the self-supporting frame subassembly 110 in more detail, in the preferred embodiment shown in the drawings a pair of fixed position panes 20, 22, and generally horizontal upper and lower appliques 40, 50 have an injection molded plastic cover member 30 of polyvinyl chloride (PVC) or reaction injection molded polyurethane (RIM) or the like, that holds the frame subassembly together. Each applique preferably serves as a structural member, meaning that it provides rigidity which contributes to the frame subassembly being self-supporting. The circumferentially extending plastic member 30 covers the upper, lower and outer periphery of the fixed panes 20, 22, and holds the fixed panes and upper and lower appliques 40, 50 in position. The frame subassembly defines a primary aperture 13 and a pair of secondary apertures 15, 17.

Optionally mechanical fasteners or so-called "toy tabs" 11 may be embedded into, or formed as unitary extensions of, the frame subassembly 110. The toy tabs act to mount the modular sliding window assembly to the motor vehicle until adhesive 200 cures.

The sliding pane subassembly 100 is snap-fit onto or over the lower applique 50. Specifically, the lower applique has a ledge 53 extending inboard away from the frame subassembly. The ledge has a step 52 configured for snap-fit attachment to a correspondingly configured feature of the sliding pane subassembly.

The sliding pane subassembly, as shown in the preferred embodiment of FIG. 5, is seen to comprise a pair of sliding panes 24, 26 attached to a run channel guide 90. The run channel guide is designed to repeatably control the force or effort necessary for an operator to move the sliding panes from a closed position in which they close the primary aperture to an open position in which the sliding panes do not close the primary aperture. Seals 42–45 may be positioned on the frame subassembly around the primary aperture to sealingly close the primary aperture when the sliding panes move to the closed position. The run channel guide and the sliding panes are slidably received in the lower run channel 70. To minimize drag efforts on the sliding panes, the run channel guide preferably has a generally cylindrical contact surface with the lower run channel.

The lower run channel has a series of projections each serving an important function. Projection 76 fits snugly into slot 91 in the run channel guide, limiting inboard-outboard and up-down motion of the sliding panes. Flexible projections 73 and 75 define a recess which the step 52 of lower applique 50 snap-fits into. One of these projections has a captivation hook 75 which captivates the step, securing the sliding pane subassembly to the frame subassembly, forming a modular snap-fit sliding window assembly. Numerous alternative designs suitable for the snap-fit will be readily apparent to those skilled in the art given the benefit of this disclosure. Additional optional features may be provided on the lower run channel and lower applique, such as drain holes 51 in the lower applique 50 and drain holes 71 in the lower run channel 70.

Extensive experience with sliding window assemblies has taught that a separate lower run channel, preferably made of a polypropylene or the like, is highly desirable to minimize problems with wind noise and to act as a barrier between the lower applique and the sliding glass. However, in a highly advantageous feature of the invention, reducing the number of parts in the modular sliding window assemblies, the upper applique 40 may form a unitary recess to serve as an upper run channel, slidingly receiving an upper peripheral edge of the sliding panes 24, 26. Additionally, dimples 62 unitary with the upper applique/upper run channel may be provided to position or guide the sliding panes.

Figure 7:
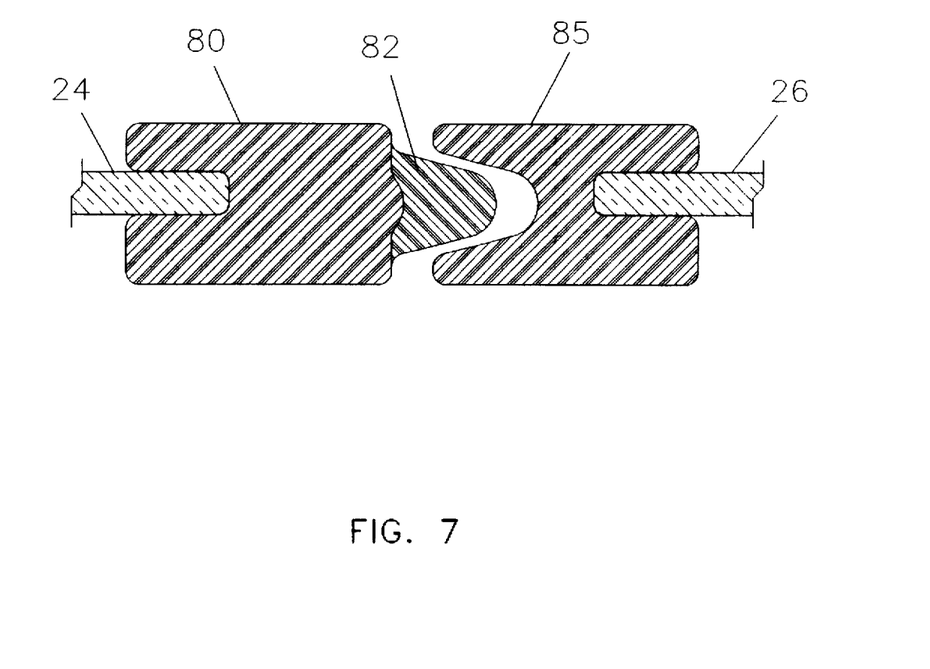
FIG. 7 is a cross-sectional view of co-extruded meeting rails of the sliding window assembly, taken along line 2—2 in FIG. 3.
Figure 8:
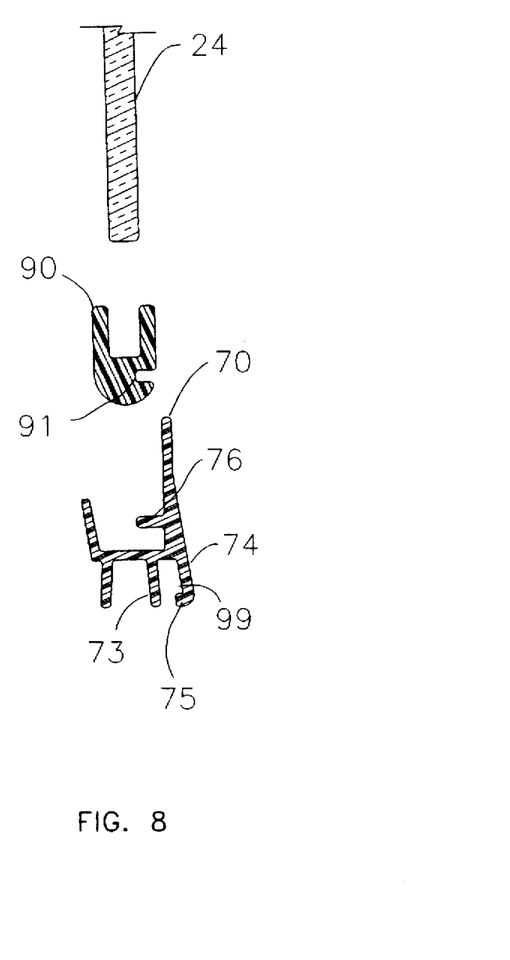
FIG. 8 is an exploded perspective view of the run channel, run channel guide and sliding pane assembly.

The sliding panes are secured together in the closed position by a latch assembly 25, comprising a latch 21 and a latch keeper 23. The latch and latch keeper may be mounted on meeting rails 80 and 85. The meeting rails are positioned on the center facing, vertical peripheral edges of the sliding panes, and are designed to provide a tight seal between the sliding panes when they move into the closed position. One meeting rail may have a projection 82 and the other meeting rail may have a recess sized to snugly receive the projection 82. In a highly advantageous feature, the projection may be made of a co-extruded elastomer of lower durometer. That is, the projection preferably is softer that the rest of the meeting rail. Use of a softer material for the projection helps to minimize gaps that might exist with a higher durometer or metallic meeting rail.

Figure 6:
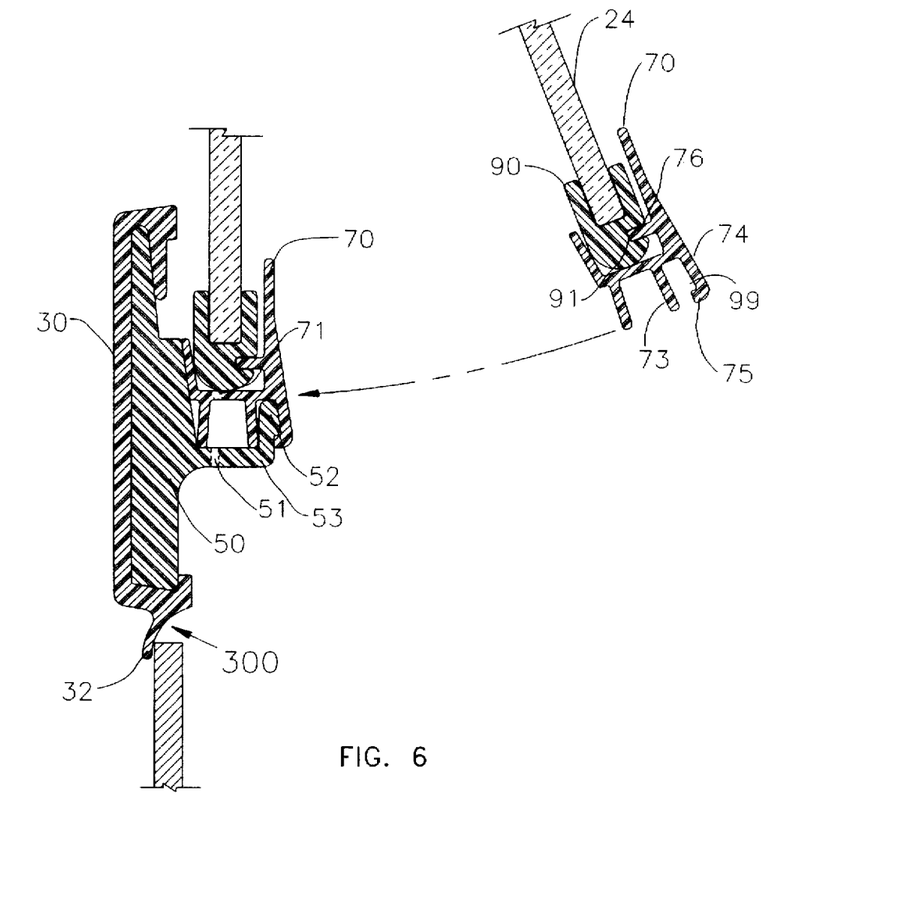
FIG. 6 is a cross-sectional view taken along line 6—6 in FIG. 2, and showing the installation path to snap-fit the sliding pane subassembly to the frame subassembly.

As shown in the outside-looking-in view of FIG. 2, and in FIG. 6, to enhance the exterior styling of the motor vehicle the injection molded plastic cover 30 preferably may have a lip 32 extending radially away from the sliding window assembly toward the sheet metal opening 300. The lip 32 thus covers the sheet metal opening.

Assembly of the modular sliding window can be accomplished by novel application of known manufacturing techniques, as now discussed. Preferably, modular sliding window assemblies in accordance with the preferred embodiments discussed above are produced in three distinct steps. The self-supporting frame subassembly 110 is produced by inserting at least one fixed pane and a pair of generally horizontal upper and lower appliques into a molding cavity. Next, an injection molded plastic is formed by introducing curable plastic into the cavity, bonding to at least a portion of the surface of the appliques and to the peripheral edges of the fixed panes. Other optional components, such as toy tabs and/or locator tabs, may also be insert molded in that operation.

The sliding pane subassembly 100 is produced by attaching at least one sliding pane to a run channel guide. The run channel guide preferably has a groove or slot sized to slidingly receive a projection of the lower run channel.

Snap-fit attachment of the two subassemblies is then carried out by inserting the upper peripheral edge of the sliding panes into the upper run channel formed by the upper applique, and then snap-fitting the lower run channel onto the lower applique.

It should be understood that although the preferred embodiment shown in the drawings has a pair of fixed panes and a pair of sliding panes, modifications are possible to the snap-fit modular sliding window assembly, such as the use of only one fixed pane or only one sliding pane. In alternative embodiments using only one sliding pane, the latch assembly 25 may have the latch keeper 23 mounted to the frame subassembly and the latch 21 mounted to the sliding pane. Alternatively, the latch assembly components can be reversed with the latch mounted to the frame subassembly and the latch keeper mounted to the sliding pane.

In view of the foregoing disclosure, those who are skilled in this area of technology will recognize that various modifications and additions can be made to the preferred embodiments discussed above without departing from the true scope and spirit of the invention. All such alternative embodiments are intended to be covered by the following claims.

What is claimed is:

1. A modular window assembly comprising, in combination:

a frame subassembly defining at least a primary aperture and comprising
        at least one fixed pane having a perimeter,
        a pair of substantially parallel, spaced, elongate appliques, and
        a circumferentially extending molded plastic cover integrating the appliques and the fixed pane at least in part by surface bonding; and
    a sliding pane subassembly comprising
        a sliding pane having a peripheral edge, and
        a generally horizontal run channel member forming a generally U-shaped run channel slidingly receiving the sliding pane;
    wherein the sliding pane subassembly has a snap-fit with the frame subassembly and the sliding pane is slidable from a closed position to an open position in which at least a portion of the primary aperture is open.

2. The modular window assembly in accordance with claim 1 wherein the molded plastic cover integrates the appliques at least in part by partially enveloping the appliques.

3. A modular window assembly comprising, in combination:
   a frame subassembly defining at least a primary aperture and comprising
      at least one fixed pane having a perimeter,
      a pair of substantially parallel, spaced, elongate appliques, and
      a circumferentially extending molded plastic cover integrating the appliques and the fixed pane at least in part by surface bonding; and
   a sliding pane subassembly comprising
      a sliding pane having a peripheral edge, and
      a generally horizontal run channel member forming a generally U-shaped run channel slidingly receiving the sliding pane;
   wherein the sliding pane subassembly has a snap-fit with the frame subassembly comprising a flexible step on one of the appliques, and the run channel member of the sliding pane subassembly has flexible projections defining at least one captivation hook, the flexible step being snap-fit into a recess between the flexible projections and the captivation hook securing the sliding pane subassembly to the frame subassembly, and the sliding pane is slidable from a closed position to an open position in which at least a portion of the primary aperture is open.

4. The modular window assembly in accordance with claim 1 wherein the sliding pane further comprises a run channel guide to control motion of the sliding pane in the up-down and inboard-outboard directions, the run channel guide being affixed to the peripheral edge of the sliding pane and having a distal end received in the U-shaped run channel of the run channel member of the sliding pane subassembly.

5. The modular window assembly in accordance with claim 4 wherein the run channel guide has a slot and the run channel member has a correspondingly configured projection extending into the U-shaped run channel and snugly received in the slot of the run channel guide for limiting inboard and outboard motion of the sliding pane.

6. The modular window assembly in accordance with claim 1 further comprising a latch assembly for latching the sliding pane in the closed position.

7. The modular window assembly of claim 1 further comprising adhesive, wherein the cover integrates the appliques and the fixed pane by adhesive surface contact.

8. A modular window assembly comprising, in combination:
   a self-supporting frame subassembly defining at least a primary aperture and comprising
      at least one fixed pane having a perimeter,
      elongate upper and lower appliques extending horizontally and being vertically spaced from each other, and
      a circumferentially extending molded plastic cover at least partially enveloping the upper and lower appliques and supporting the fixed position pane at least in part by surface bonding; and
   a sliding pane subassembly comprising
      a pair of sliding panes, each having an upper peripheral edge and
      a lower peripheral edge, and
      a lower run channel member defining a generally U-shaped lower run channel sized to receive the lower peripheral edges of the sliding panes and allow horizontal sliding movement of the sliding panes;
   wherein the sliding pane subassembly has a snap-fit with the frame subassembly, the upper peripheral edges of the sliding panes being slidingly received in a generally U-shaped upper run channel defined at least in part by the upper applique, and the sliding panes being slidable from a closed position in which the sliding panes sealingly close the primary aperture to an open position in which at least a portion of the primary aperture is open.

9. The modular window assembly in accordance with claim 8 wherein the lower applique has a flexible flange forming a step, and the lower run channel member has a flexible projection with a captivation hook, the captivation hook together with the step forming at least in part the snap-fit between the sliding pane subassembly and the frame subassembly.

10. The modular window assembly in accordance with claim 8 wherein each sliding pane further comprises a run channel guide for controlling motion of the sliding pane, the run channel guide being affixed to the peripheral edge of the sliding pane and having a slot snugly, slidingly receiving a correspondingly configured projection of the run channel member.

11. The modular window assembly in accordance with claim 10 wherein the sliding panes are vertically captivated between the upper applique and the lower run channel member.

12. The modular window assembly in accordance with claim 11 wherein the upper applique has unitary dimples projecting into the upper run channel for guiding the sliding panes.

13. The modular window assembly in accordance with claim 8 further comprising seal means positioned about the circumference of the primary aperture for sealing the primary aperture when the sliding panes are in the closed position.

14. The modular window assembly in accordance with claim 8 wherein a drain passageway extends downwardly from the lower run channel through the run channel member and the lower applique.

15. The modular window assembly in accordance with claim 8 further comprising a latch assembly for securing the sliding panes to one another in the closed position, comprising a latch on one of the sliding panes and a latch keeper on another of the sliding panes.

16. The modular window assembly in accordance with claim 8 further comprising an elastomeric meeting rail positioned on the peripheral edge of one of the sliding panes, and a second elastomeric meeting rail positioned on the peripheral edge of another of the sliding panes, at least a portion of the second, meeting rail being sealingly seated in the first meeting rail when the sliding panes are in the closed position.

17. The modular window assembly in accordance with claim 16 wherein the first meeting rail has a longitudinally extending recess open toward the second meeting rail, and the second meeting rail has a longitudinally extending contact segment sealingly received in the recess of the first meeting rail when the sliding panes are in the closed position.

18. The modular window assembly in accordance with claim 17 wherein the contact segment is co-extruded with and has a lower durometer than a remaining portion of the second meeting rail.

19. A modular sliding window assembly for installation into a window opening in a motor vehicle body, comprising, in combination:

a pair of fixed panes each having a perimeter;

an upper structural applique having a surface and defining an upper run channel;

a lower structural applique having a surface and an inwardly projecting base with a flexible step;

a molded plastic frame extending around at least a portion of the perimeter of the fixed panes and covering at least a portion of the surface of the upper and lower appliques;

a pair of sliding panes each having a perimeter and a run channel guide attached to a lower portion of the perimeter; and a lower run channel member defining a lower run channel in which the run channel guides are slidingly received;

wherein upper peripheral edges of the sliding panes are slidingly received in the upper run channel with restricted inboard-outboard movement, and the step of the lower applique has a snap-fit with a recess between flexible projections of the lower run channel member, the step being captivated by a captivation hook formed by one of the flexible projections.

20. A method of making a window assembly for closing and opening in a motor vehicle body, the method comprising:

producing a frame subassembly comprising at least a first fixed pane, by injection molding a cover member into integral attachment with the fixed pane;

producing a sliding pane subassembly comprising at least a first sliding pane and a lower run channel member defining a lower run channel, by inserting the sliding pane into the lower run channel; and snap-fitting the sliding pane subassembly to the frame subassembly.

21. The method of making a window assembly in accordance with claim 20 wherein a) producing the frame subassembly comprises the steps of:

positioning in a molding cavity an upper applique defining an upper run channel, a lower applique, the first fixed pane as a right-side fixed position pane, and a left-side fixed position pane;

closing the molding cavity; and introducing a curable polymeric material into the molding cavity to form the cover member as a full-circumference member bonded to a surface area of each of the fixed position panes and at least partially enveloping the upper and lower appliques;

b) the sliding pane subassembly further comprises a second sliding pane; and c) the step of producing the sliding pane subassembly comprises:

attaching elongate meeting rails to an edge of each of the sliding panes, attaching a run channel guide to a lower portion of each of the sliding panes, and sliding the run channel guides of the sliding panes into the lower run channel.

22. The method of making a window assembly in accordance with claim 21 wherein the lower run channel of the sliding pane subassembly is snap-fit to the lower applique of the frame subassembly.

23. The method of making a window assembly in accordance with claim 22, further comprising the step of inserting an upper peripheral edge of the sliding panes into the upper run channel, the step of snap-fitting the sliding pane subassembly to the frame subassembly comprising then pressing the lower run channel member to the lower applique to snap-fit a captivation hook of a flexible projection of the lower run channel member over a flexible step of the lower applique.

24. The modular window assembly of claim 1 wherein the molded plastic cover encapsulates a portion of the appliques and a portion of the perimeter of the fixed pane.

* * * * *